United States Patent [19]
Terpstra

[11] Patent Number: 5,203,245
[45] Date of Patent: Apr. 20, 1993

[54] SWINGING BLADE GUARD ASSEMBLY

[75] Inventor: Daniel A. Terpstra, Kirkwood, Mo.

[73] Assignee: Emerson Electric Co., St. Louis, Mo.

[21] Appl. No.: 962,868

[22] Filed: Oct. 19, 1992

Related U.S. Application Data

[63] Continuation-in-part of Ser. No. 811,227, Dec. 20, 1991.

[51] Int. Cl.⁵ .......................... B23D 45/14; B27B 5/18
[52] U.S. Cl. ........................................ 83/397; 83/478; 83/490
[58] Field of Search .......................... 83/397, 478, 490

[56] References Cited

U.S. PATENT DOCUMENTS

| | | | |
|---|---|---|---|
| 4,805,504 | 2/1989 | Fushiya et al. | 83/397 |
| 4,934,233 | 6/1990 | Brundage et al. | 83/478 |
| 5,020,406 | 6/1991 | Sasaki et al. | 83/397 |
| 5,063,805 | 11/1991 | Brundage et al. | 83/468.3 |
| 5,146,825 | 9/1992 | Dehari | 83/397 |

*Primary Examiner*—Hien H. Phan
*Attorney, Agent, or Firm*—Polster, Lieder, Woodruff & Lucchesi

[57] ABSTRACT

A swinging blade guard assembly for a motor driven saw blade movable from an upper at rest to a lower operational position is disclosed. An upper blade guard is fixed to a pivotally mounted supporting arm that carries the motor driven saw blade and upper blade guard. A lower swinging blade guard is pivotally mounted to the upper blade guard for fully covering the blade in its at rest position and for exposing the saw blade when moved to its operational position. The swinging blade guard assembly includes an elongated link that is pivotally attached at one end to a frame support and includes a pre-configured slot at an opposite end which receives a slidable pin attached to the lower swinging blade guard adjacent its pivotal mounting to the upper blade guard. A bearing element is also attached to the upper blade guard in laterally spaced relationship to the pin for engaging an upper surface of the elongated link. Rotation of the saw blade from an upper at rest to a lower operational position causes the bearing to press against the side of the link while also causing edge surface areas surrounding the pre-configured slot in the link to press against the pin to rotate the swinging blade guard assembly for exposure of the saw blade.

10 Claims, 5 Drawing Sheets

SWINGING BLADE GUARD ASSEMBLY

CROSS REFERENCE TO RELATED APPLICATION

This is a continuation-in-part of U.S. Pat. application Ser. No. 07/811,227 filed Dec. 20, 1991 entitled "MITER SAW APPARATUS".

BACKGROUND OF THE INVENTION

The present invention relates to a swinging blade guard assembly for a motor driven saw blade, and more particularly, a swinging blade guard assembly that provides controlled exposure of the saw blade, as may be desired, from an upper at rest to a lower operational position.

Powered or compound miter saws are used for the miter and bevel cutting of wood, metals, and plastics in a variety of industries. For example, in the construction industry, moldings, door frames, chair rails and the like must be miter cut at the corners, and in addition, a combined miter/bevel cut is required in certain instances for the proper fitting of parts. In such powered or compound miter saws, blade guards are used to enclose the blade, typically an upper fixed blade guard and a lower swinging blade guard that uncovers the rotating motor driven saw blade when moved from the upper at rest to a lower operational position where cutting of the workplace takes place.

The present invention is directed specifically to a new and improved swinging blade guard assembly which overcomes some of the problems associated with prior art devices. Examples of powered miter saws with swinging blade guards are shown, for example, in U.S. Pat. Nos. 4,805,504 and 5,020,406. In each of these patents, the lower portion of the motor driven saw blade is fully covered when the motor driven saw blade is in an upper at rest position. Each of these patents also rotate the lower guard during the downward or operational stroke of the motor driven saw blade to its cutting position.

One of the problems associated with the swinging blade guard assemblies of the prior art is that the swinging blade guard does not rotate rapidly enough during the first part of the downstroke of the motor driven saw blade, in order to enable the swinging blade guard to clear a workpiece, especially when performing a bevel cut. At the same time, the swinging blade guard should not rotate so far that it exposes the front of the motor driven saw blade above the workpiece, any more than necessary. The prior art is thus restricted because it does not provide variable or controlled exposure of the motor driven saw blade during various phases of the downward or operational stroke of the motor driven saw blade particularly, in connection with bevel cuts for which they were not designed.

The present invention overcomes the problems associated with the prior art for powered miter saws and other types of motor driven saw blades used in other types of saw constructions which are moved from an upper to a lower position in cutting workpieces.

SUMMARY OF THE INVENTION

Among the several objects and advantages of the present invention include:

The provision of a new and improved swinging blade guard assembly for a motor driven saw blade movable from an upper at rest to a lower operational position, which overcomes the aforenoted deficiencies of prior art devices;

The provision of the aforementioned new and improved swinging blade guard assembly which provides variable or controlled exposure of the motor driven saw blade during movement from an upper at rest to a lower operational position;

The provision of the aforementioned new and improved swinging blade guard assembly which rotates a swinging blade guard assembly rapidly through the first portion of blade travel in order to clear a workpiece to be cut, with subsequent slower rotation during the remaining travel of the motor driven saw blade and eventual stopping of the guard rotation at the desired position;

The provision of the aforementioned new and improved swinging blade guard assembly in which a pivoting elongated link has a pre-configured slot and slidable pin combination that cooperates with a roller that engages a pre-configured shoulder on the elongated link to provide the aforementioned variable or controlled opening of the swinging blade guard assembly;

The provision of the aforementioned new and improved swinging blade guard assembly which also facilitates access to the motor driven saw blade shaft for removing or changing the saw blade; and The provision of the aforementioned new and improved swinging blade guard assembly which is easy and practical to use and operate, simple and inexpensive to maintain and repair, is extremely durable and long lasting in construction, is relatively inexpensive permitting individual purchase and ownership thereof, and is otherwise well adapted for the purposes intended.

Briefly stated, the swinging blade guard assembly of the present invention is designed for use with a motor driven saw blade, such as in a powered or compound miter saw or the like. The swinging blade guard assembly includes a supporting arm pivotally mounted at one end to a frame support with the rotatably mounted motor driven saw blade at an opposite end of the supporting arm. The motor driven saw blade is movable about the pivotal mounting of the supporting arm from an upper at rest to a lower operational position An upper blade guard is fixed to the supporting arm for encasing upper areas of the saw blade on a permanent basis, while the lower swinging blade guard is pivotally mounted to the upper blade guard for fully covering the blade when in its at rest position and for exposing the saw blade when moved to its operational position. An elongated link is pivotally attached at one end to the frame support and includes a pre-configured slot at an opposite end which receives a slidable pin that is attached to a lower swinging blade guard adjacent the pivotal mounting of the lower swinging blade guard to the upper blade guard. A bearing element is attached to the upper blade guard in laterally spaced relationship to the pin for engaging the upper surface of the elongated link. As a result of the aforementioned construction, rotation of the saw blade from an upper at rest to a lower operational position causes the bearing to press against the side of the elongated link while also causing edge surface areas surrounding the pre-configured slot in the elongated link to press against the slidable pin to rotate the lower swinging blade guard for exposure of the saw blade.

The upper surface of the elongated link includes a pre-configured shoulder which cooperates with the pre-configured slot to control the exposure of the lower swinging blade guard relative to the saw blade. The pre-configured shoulder and pre-configured slot are constructed to facilitate rapid rotation of the lower swinging blade guard and exposure of the saw blade relative to a workpiece during initial downward movement of the motor driven saw blade, with subsequent slower rotation of the lower swinging blade guard and slower exposure of the saw blade during the remainder of the motor driven saw blade travel. The pre-configured slot includes upper and lower slot sections connected by an intermediate curvilinear slot section, and the pre-configured shoulder includes upper and lower surface areas connected by an intermediate inclined surface area.

The lower swinging blade guard is pivotally mounted on the upper blade guard in an eccentrically offset position relative to a saw blade shaft rotatably supporting the motor driven saw blade. The eccentrically offset pivotal mounting of the lower swinging blade guard is located on a detachable mounting plate that also pivots on a second eccentrically offset pivot mounting when detached from the upper blade guard to facilitate access to the saw blade shaft for removing or changing the saw blade. The slidable pin is mounted on the lower swinging guard retaining plate.

These and other objects and advantages of the present invention will become apparent from the description that follows.

BRIEF DESCRIPTION OF THE DRAWINGS

In the drawings.

Corresponding reference numerals will be used throughout the various figures of the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Although the swinging blade guard assembly is shown and described in connection with a powered or compound miter saw, it is to be understood that the swinging blade guard assembly of the present invention may be used with other types of rotating saw constructions which are moved from an upper to a lower position, as will be apparent.

Figure 11:
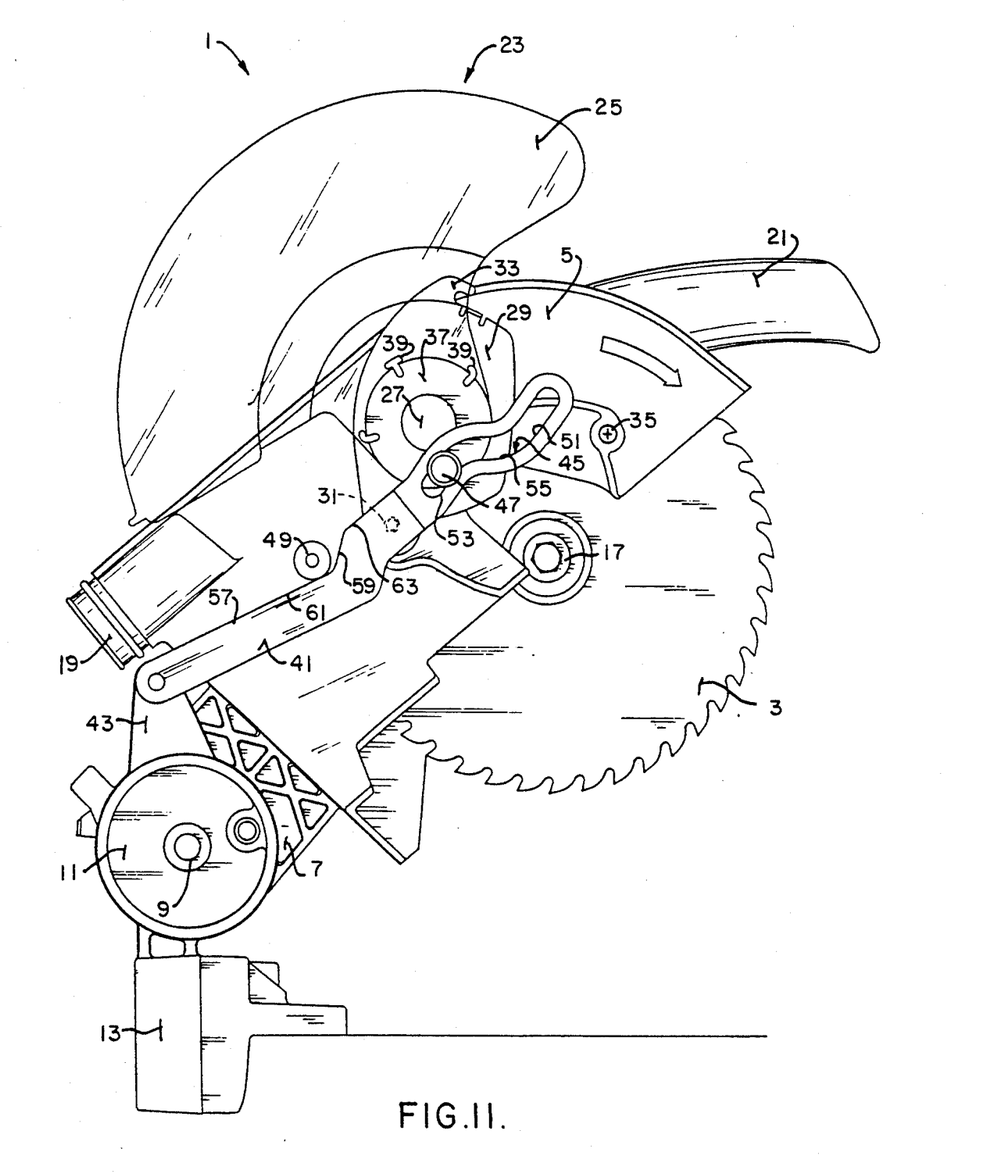
FIG. 11 is an enlarged side elevational view of the powered miter saw with the swinging blade guard assembly in an upper at rest position and further illustrating the manner in which a swinging blade guard assembly is detachably mounted to an upper blade guard for access to the saw blade shaft to facilitate removal or replacement thereof.

FIGS. 1–5 are shown on several sheets of the drawings and illustrate various positions of the swinging blade guard assembly from an upper at rest to a lower operational position, while FIGS. 6–10 illustrate, on a single sheet, the same positions illustrated in FIGS. 1–5, in order to facilitate quick review of the various positions of the swinging blade guard assembly on a single sheet of drawings. FIG. 11 illustrates a disassembled position of the swinging blade guard assembly to facilitate access to the saw blade shaft for removal or replacement of the saw blade.

As discussed above, the swinging blade guard assembly of the present invention is constructed to provide variable or controlled exposure of the saw blade, as may be desired, from an upper at rest to a lower operational position. As will now be discussed, this enables early and rapid rotation of the swinging blade guard assembly during the first part of the downward stroke of the saw blade, in order to clear a workpiece to be cut, especially when performing a bevel cut or for thicker workpieces. As will be appreciated, the swinging blade guard assembly, at the same time, should not rotate so far as to expose the front or operator side of the saw blade above the workpiece any more than is necessary. Subsequent downward movement of the saw blade exposes the saw blade at a slower rate until movement of the swinging blade guard assembly is stopped.

For a complete description of the powered or compound miter saw apparatus, reference is made to Applicant's aforementioned co-pending patent application in order to understand the various operating components of the powered or compound miter saw.

For purposes of the present invention, attention can now be focused on the swinging blade guard assembly that is used in connection with the powered or compound miter saw 1 illustrated in the drawings.

The powered or compound miter saw 1 includes a motor driven saw blade 3 which is rotatably mounted within a fixed upper blade guard and housing 5 and is power driven by an electric motor (not shown) that is mounted to the non-visible side of the upper blade guard and housing 5. The upper blade guard and housing 5 is fixedly mounted to a supporting arm 7 that is pivotally mounted at 9 to a frame support such as upper closed cylinder 11 in a pair of transversely extending closed cylinders 11, 13, the latter being mounted to a turntable 15 shown only in diagrammatic form in the drawings. Again, reference is made to Applicant's aforementioned co-pending patent applications for a more specific description and illustration of such components, including the motor.

The upper blade guard and housing 5, with the electric motor (not shown) are both mounted to the pivotally mounted supporting arm 7, with the saw blade shaft 17 extending through the supporting arm 7 for rotatably mounting the saw blade 3 within the upper blade guard and housing 5, as illustrated in the drawings.

For collecting dust and other debris generated from cut workpieces, a dust bag (not shown) may be attached to an exhaust outlet 19 at the rear of the upper blade guard and housing 5, while a handle 21, for raising and lowering the power driven saw blade between an upper at rest and lower operational position, is mounted to the front or operator side of the power miter saw apparatus 1.

The fixed upper blade guard and housing 5, along with the supporting arm 7, are pivotally mounted at 9 to the supporting frame, including transversely extending closed cylinders 11, 13, for movement of the rotatably driven saw blade 3 from an upper at rest position to a lower operational or full cut position. As the rotatably driven saw blade 3 is moved from the upper at rest to the lower operational position, in the sequential illustrations of FIGS. 1-5 and the single sheet of drawings containing FIGS. 6-10, the lower swinging blade guard assembly 23 provides a variable or controlled exposure of the rotatably driven saw blade 3, as will now be described.

The swinging blade assembly generally identified at 23 includes a molded plastic housing 25, molded as illustrated in the drawings as a transparent plastic cover or shroud that surrounds the rotating saw blade 3. The molded plastic cover 25 is pivotally mounted to the fixed upper blade guard 5 at the swinging blade guard pivot point 27. The swinging blade guard pivot point 27, as best seen in FIG. 11 of the drawings, is part of a detachable mounting plate 29. Note in FIG. 11 that the detachable mounting plate 29 may be rotated or pivoted about the rivet or other fastener 31, shown in dotted lines, when it is desired to obtain access to the saw blade shaft 17, for removal or replacement of the saw blade. The detachable mounting plate 29 is rotated from the blade changing or removal position shown in FIG. 11 to that illustrated in FIGS. 1-5 and 6-10 of the drawings where an outer finger or hook 33 is received over a screw 35 attached to the upper blade guard 5.

The pivot point 27 for the lower swinging blade guard 25 is mounted within a ring support 37 that is positioned by spaced bosses 39 and secured to the detachable mounting plate 29 by a suitable fastener through pivot point 27. It will be seen that pivot point 27 is eccentrically offset from the saw blade shaft 17, with the detachable mounting plate 29 also eccentrically offset on a second pivot mounting 31 when the detachable mounting plate 29 is detached from the upper blade guard 5, as illustrated in FIG. 11 of the drawings.

Figure 1:
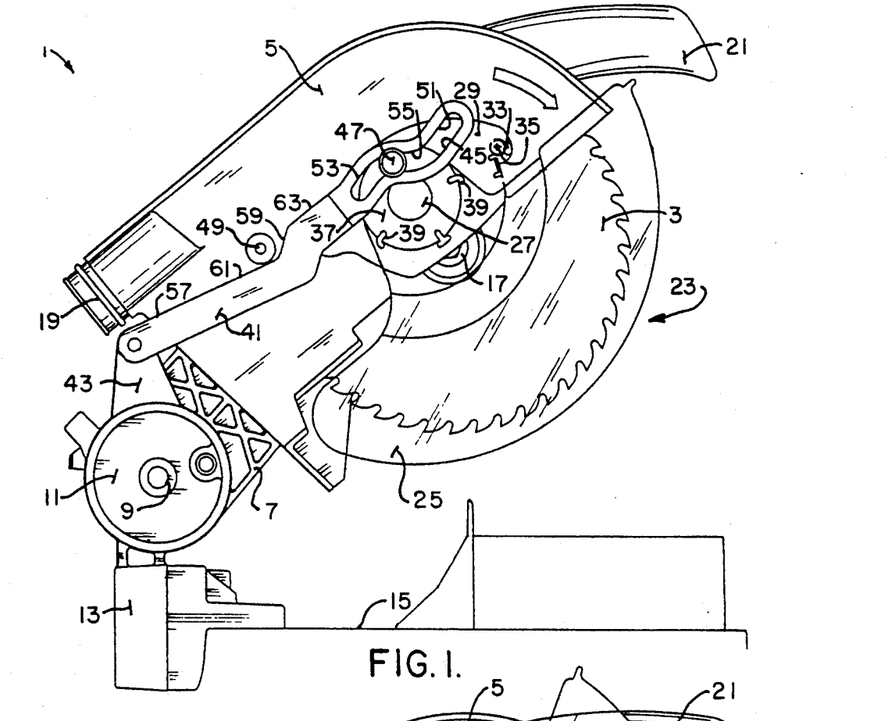
FIG. 1 is a side elevational view of a powered miter saw with a motor driven saw blade including the lower swinging blade guard assembly of the present invention in the full raised or at rest position.

A torsional or coil spring (not shown) is used to normally urge the swinging blade guard 25 into a closed position fully covering the saw blade 3 when in its upper at rest position as shown in FIG. 1. The type of torsional or coil spring employed is illustrated in FIG. 12 of U.S. Pat. No. 4,934,233 where a torsional spring is mounted between the lower swinging blade guard and the detachable mounting plate for normally resiliently biasing the lower swinging blade guard to fully cover the motor driven saw blade 3 when in its at rest position. The same type of torsional or coil spring will be utilized for the same purpose in the present construction. As the motor driven saw blade 3 is moved from its at rest position shown in FIG. 1, in a downward stroke to its lower operational position as sequentially illustrated in FIGS. 2-5, the present invention employs an actuator arm or elongated link combined with other components to overcome the normal resilient bias of the torsional or coil spring (not shown) to provide controlled exposure of the motor driven saw blade 3.

Specifically, the present invention employs an elongated link 41 pivotally attached to an upstanding flange or ear 43 forming part of the frame support. At the opposite end of the elongated link 41, there is a pre-configured slot 45 that receives a slidable pin 47 attached to the lower swinging blade guard adjacent to the pivotal mounting 27 of the lower swinging blade guard 25. Specifically, the slidable pin 47 is mounted to the ring support 37 surrounding the pivot support 27, as is clearly illustrated in the drawings. A bearing element 49 is attached to the upper blade guard 5 in laterally spaced relationship to the slidable pin 47 for engaging an upper surface of the elongated link 41.

It will also be noted that the pre-configured slot 45 includes upper and lower slot sections 51, 53 connected by an intermediate curvilinear slot section 55. The upper surface 57 of the elongated link 41 includes a pre-configured shoulder 59 that defines an intermediate inclined surface area between upper and lower surface areas 61, 63 on the upper surface 57 of the elongated link 41.

With the above construction, movement of the saw blade 3 from an upper at rest to a lower operational position, sequentially illustrated in FIGS. 1-5 and 6-10 of the drawings, causes the bearing 49 to press against an upper surface 57 of the elongated link 41, while causing edge surface areas surrounding the pre-configured slot 45 in the link 41 to press against the slidable pin 47 for rotating the lower swinging blade guard 25 against the resilient or biasing force of the torsional or coil spring (not shown), thus exposing the saw blade 3.

The upper surface 57 of the elongated link 41 includes a pre-configured shoulder 59 which cooperates with the pre-configured slot 45 to control the exposure of the lower swinging blade guard relative to the saw blade. In other words, by adjusting the shape of the pre-configured slot 45 with the upper surface 57 of the elongated link, the incremental motion and movement of the lower swinging blade guard 25 can be controlled, as desired.

In the embodiment illustrated in the drawings, it will be noted that the pre-configured shoulder 59 is an intermediate inclined surface area between upper and lower surface areas 61, 63, all of which cooperate with the upper and lower slot sections 51, 53 and the intermediate curvilinear slot section 55 of the pre-configured slot. The arrangement of the pre-configured shoulder and the pre-configured slot in the illustrated construction facilitates rapid rotation of the lower swinging blade guard 25 to expose the saw blade 3 relative to a workpiece during initial downward movement of the motor driven saw blade 3, with subsequent slower rotation of the lower swinging blade guard 25 and slower exposure of the saw blade 3 during the remainder of the motor driven saw blade travel.

Figure 2:
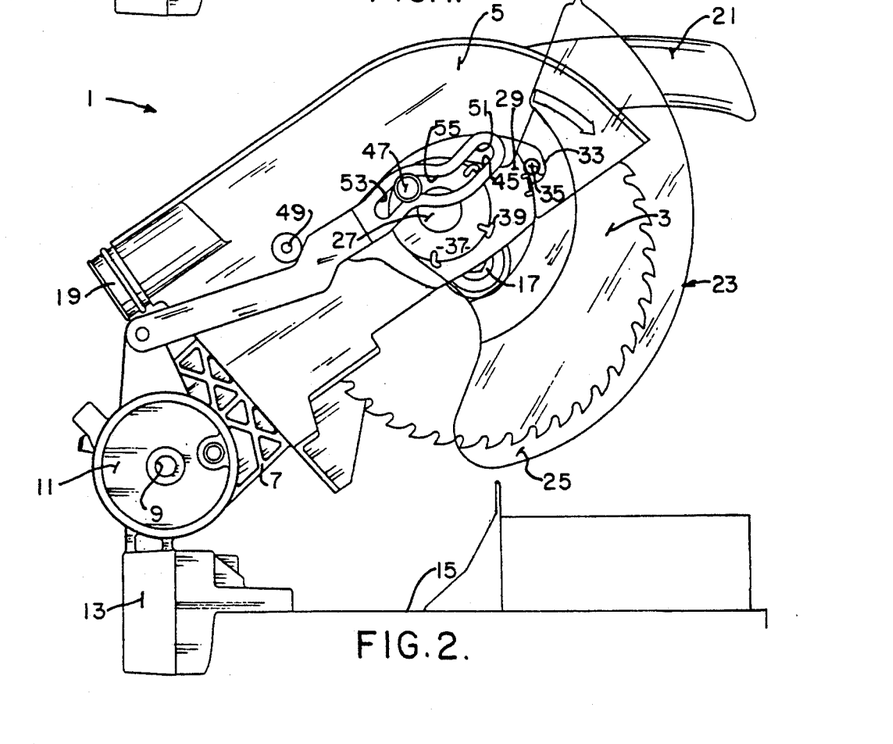
FIG. 2 is also a side elevational view of the powered miter saw employing the swinging blade guard assembly of the present invention illustrated in FIG. 1 where the motor driven saw blade is moved a short distance downward in its travel while the lower swinging blade guard assembly is rapidly rotated open to clear a workpiece during the first portion of the travel of the motor driven saw blade.

This can be understood by comparing the position of the lower swinging blade guard 25 when the saw blade 3 is in an upper at rest position, as shown in FIG. 1, with the relative position of the lower swinging blade guard 25 relative to the saw blade 3 when the supporting arm 7 is rotated about pivot point 9 to an approximate 5° downward position as illustrated in FIG. 2. In the FIG. 1 illustration, the lower swinging blade guard 25 fully covers the portion of blade 3 not covered by the upper guard. However, when rotated approximately 5° downward as shown in FIG. 2 of the drawings, it will be noted that the lower swinging blade guard 25 is rotated approximately 34° open by action of the ball bearing 45 on the upper surface 57 of the elongated link 41, together with the slidable movement of the pin 47 in the pre-configured slot 45.

Figure 3:
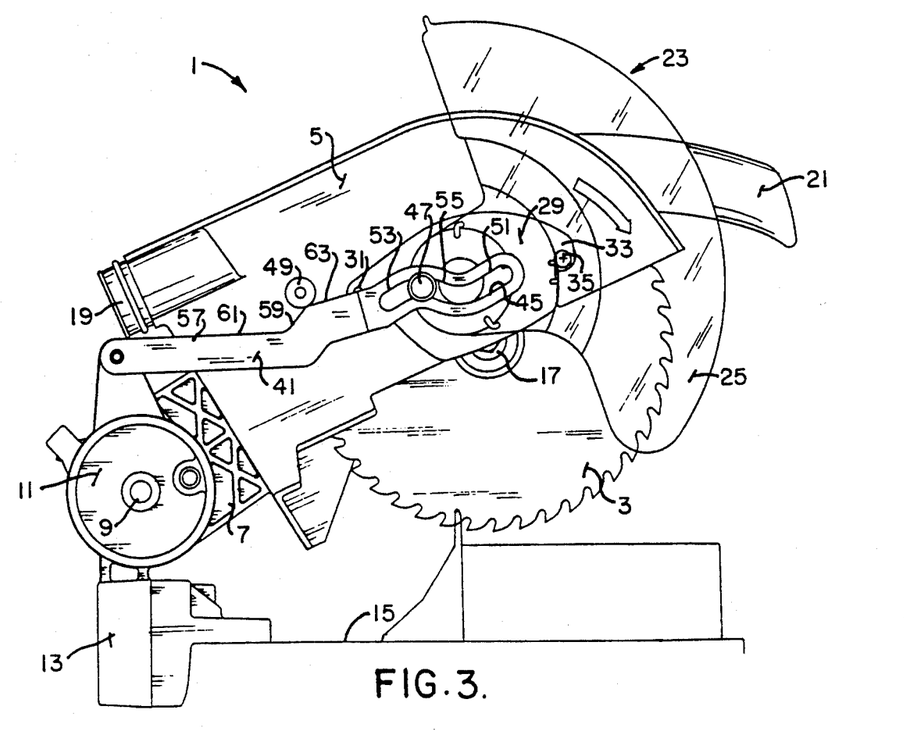
FIG. 3 is another side elevational view of the powered miter saw employing the swinging blade guard assembly of the present invention where the motor driven saw blade is moved to a further downward position with the lower swinging blade guard assembly rapidly and substantially opened to expose the saw blade for cutting, while still covering a substantial portion of the saw blade along the front or operator side of the powered miter saw.

When rotated about the pivot point 9 approximately 15° downward as illustrated in FIG. 3 of the drawings, the lower swinging blade guard 25 is rotated approximately 86° open, thus showing the rapid rotation of the lower swinging blade guard 25 and exposure of the saw blade 3 to a workpiece during initial downward movement of the saw blade 3.

Figure 4:
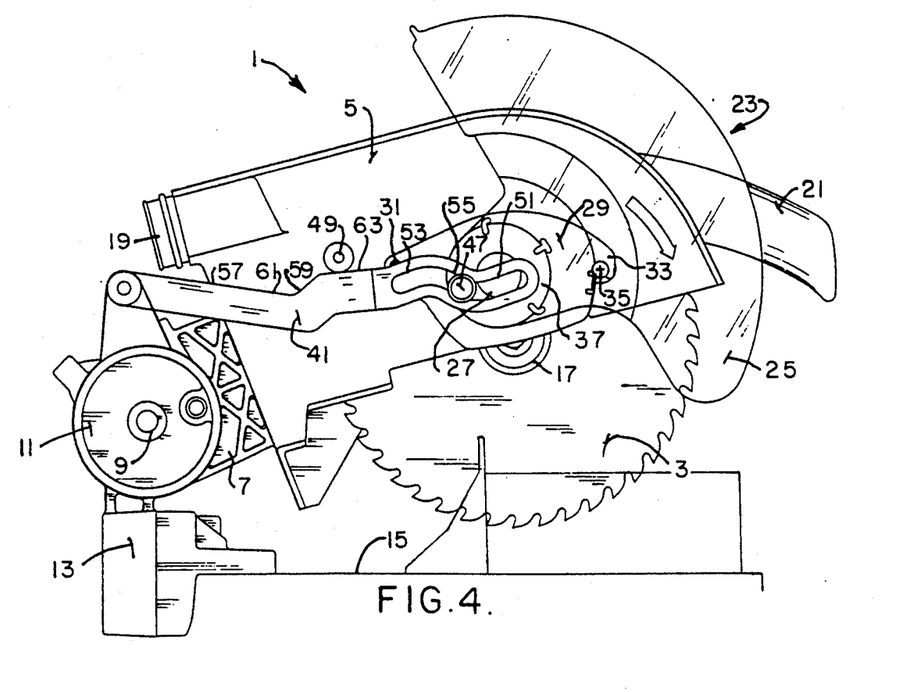
FIG. 4 is a further side elevational view of the powered miter saw employing the swinging blade guard assembly of the present invention with further downward travel of the motor driven saw blade and even further exposure of the saw blade to the workpiece for cutting thereof, while still partially covering the front or operator side of the saw blade.

In FIG. 4 of the drawings, the saw blade 3 is rotated about pivot point 9 approximately 25° downward, and this enables the lower swinging blade guard 25 to be rotated approximately 108° open. As will be appreciated, the lower swinging blade guard 25 has a slower rotation in the FIG. 4 illustration than in the FIGS. 2-3 illustrations, providing slower exposure of the saw blade 3 near the bottom of the saw blade travel. In FIG. 4, it will be noted that the lower swinging blade guard 25 has a substantial area thereof on the front or operator side of the saw I.

Figure 5:
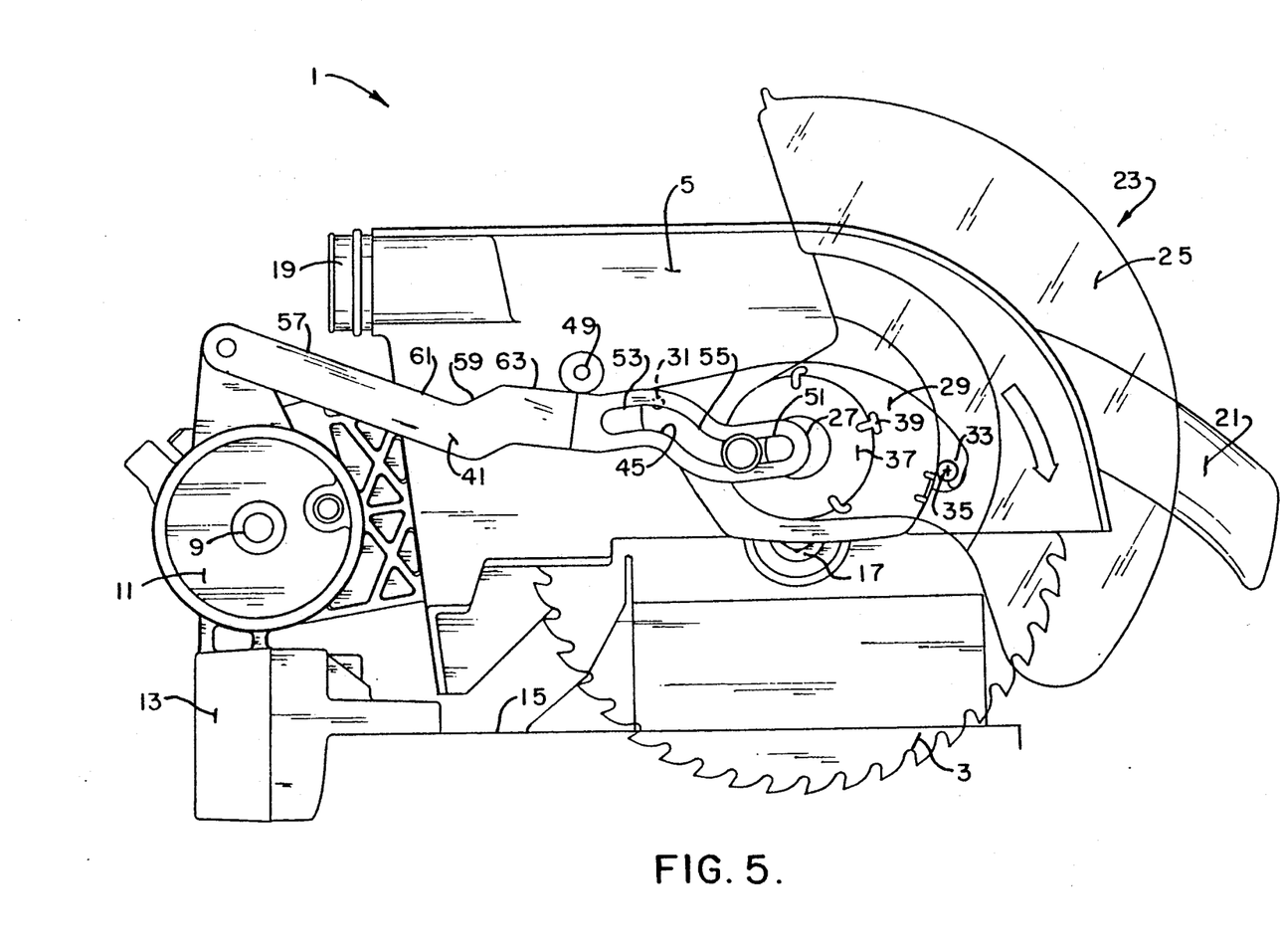
FIG. 5 is a still further side elevational view of the powered miter saw with the swinging blade guard assembly of the present invention where the motor driven saw blade is in its full down position for workpiece cutting, with the swinging lower blade guard assembly still providing front or operator side protection above the workpiece, as illustrated.
Figures 6, 7:
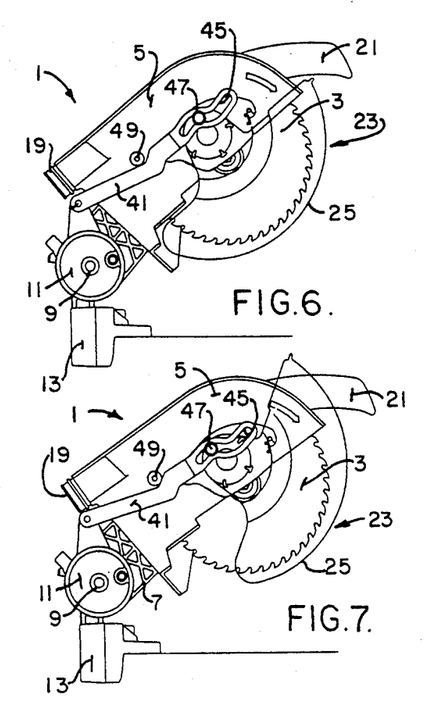
FIGS. 6–10 are side elevational views of the powered miter saw with swinging blade guard assembly of the present invention illustrating on a single sheet of paper the full range of upper at rest to lower operational positions, including during the various phases of movement, as previously illustrated in FIGS. 1–5 of the drawings.
Figure 8:
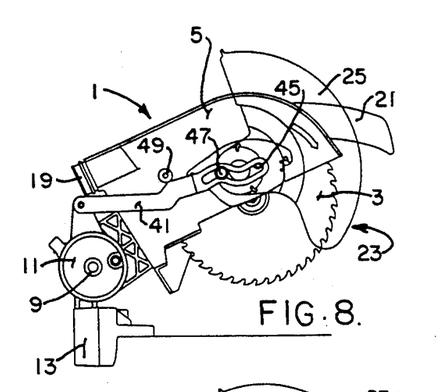
Figure 9:
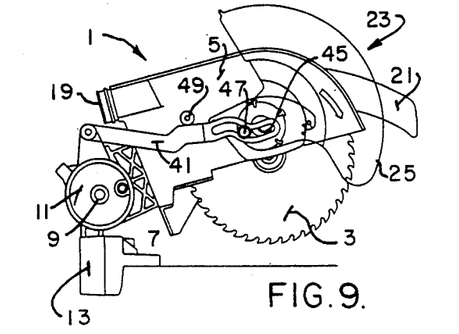
Figure 10:
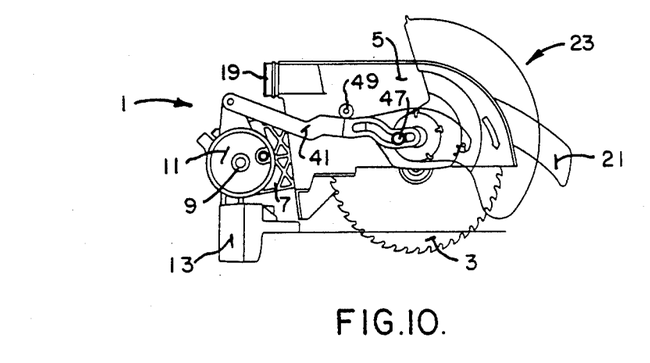

In the final illustration shown in FIG. 5 of the drawings, the saw blade 3 is rotated in its full down or operational position, and it will be seen that the lower swinging blade guard 25 still provides protection to the operator above the workpiece, even though the saw blade 3 is fully exposed for cutting.

FIGS. 6-10 of the drawings illustrate on a single sheet and the relative sequential positions of the saw in FIGS. 1-5, respectively. Comparison of each of FIGS. 6-10 shows the relative position of the lower swinging blade guard 25 to the saw blade 3, for ease of understanding the sequential movements and positions of the lower swinging blade guard 25 relative to the saw blade 3.

From the foregoing, it will now be appreciated that the swinging blade guard assembly of the present invention provides a variable or controlled exposure of the saw blade in a powered miter saw or other saw construction, thus meeting the objects, features and advantageous results of the present invention, as noted above.

As various changes could be made in the above constructions without departing from the scope of the invention, it is intended that all matter contained in the above description or shown in the accompanying drawings shall be interpreted as illustrative and not in a limiting sense.

I claim:

1. In a motor driven saw blade including a supporting arm pivotally mounted at one end to a frame support with a rotatably mounted motor driven saw blade at an opposite end of said supporting arm, said motor driven saw blade being movable about the pivotal mounting of the supporting arm from an upper at rest to a lower operational position, an upper blade guard fixed to said supporting arm for encasing upper areas of said saw blade, and a lower swinging blade guard pivotally mounted to said upper blade guard for fully covering the blade when in its rest position and for exposing the saw blade when moved to its operational position, the improvement comprising:

a swinging blade guard assembly including an elongated link pivotally attached at one end to said frame support and having a pre-configured slot at an opposite end which receives a slidable pin that is attached to the lower swinging blade guard adjacent the pivotal mounting of the lower swinging blade guard to the upper blade guard, and a bearing element attached to the upper blade guard in laterally spaced relationship to said pin for engaging an upper surface of the elongated link, whereby movement of the saw blade from an upper at rest to a lower operational position causes the bearing to press against an upper surface of the link while also causing edge surface areas surrounding the pre-configured slot in the link to press against the pin to rotate the lower swinging blade guard for exposure of said saw blade.

2. The improvement as defined in claim 1 wherein the upper surface of the elongated link includes a pre-configured shoulder which cooperates with the pre-configured slot to control the exposure of the lower swinging blade guard relative to the saw blade.

3. The improvement as defined in claim 2 wherein the pre-configured shoulder and pre-configured slot are constructed to facilitate rapid rotation of said lower swinging blade guard and exposure of the saw blade relative to a workpiece during initial downward movement of the motor driven saw blade, with subsequent slower rotation of the lower swinging blade guard and slower exposure of the saw blade during the remainder of the motor driven saw blade travel.

4. The improvement as defined in claim 3 wherein the pre-configured slot includes upper and lower slot sections connected by an intermediate curvilinear slot section, and said pre-configured shoulder includes upper and lower surface areas connected by an intermediate inclined surface area.

5. The improvement as defined in claim 4 wherein the lower swinging blade guard is pivotally mounted on said upper blade guard in an eccentrically offset position relative to a saw blade shaft rotatably supporting said motor driven saw blade.

6. The improvement as defined in claim 5 wherein the eccentrically offset pivotal mounting of said lower swinging blade guard is located on a detachable mounting plate that also pivots on a second eccentrically offset pivot mounting when detached from said upper blade guard to facilitate access to the saw blade shaft for removing or changing the saw blade.

7. The improvement as defined in claim 6 wherein the slidable pin is mounted to retaining plate of lower guard.

8. A swinging blade guard assembly for a motor driven saw blade including a supporting arm pivotally mounted at one end to a frame support with the rotatably mounted motor driven saw blade at an opposite end of said supporting arm, said motor driven saw blade being movable about the pivotal mounting of the supporting arm from an upper at rest to a lower operational position, an upper blade guard fixed to said supporting arm for encasing upper areas of said saw blade, a lower swinging blade guard pivotally mounted to said upper blade guard for fully covering the blade when in its rest position and for exposing the saw blade when moved to its operational position, an elongated link pivotally attached at one end to said frame support and having a pre-configured slot at an opposite end which receives a slidable pin that is attached to the lower swinging blade guard adjacent the pivotal mounting of the lower swinging blade guard to the upper blade guard, and a bearing element attached to the upper blade guard in laterally spaced relationship to said pin for engaging an upper surface of the elongated link, whereby rotation of the saw blade from an upper at rest to a lower operational position causes the bearing to press against the side of the link while also causing edge surface areas surrounding the pre-configured slot in the link to press against the pin to rotate the lower swinging blade guard for exposure of said saw blade.

9. A swinging blade guard assembly for a motor driven saw blade including a supporting arm pivotally mounted at one end to a frame support with the rotatably mounted motor driven saw blade at an opposite end of said supporting arm, said motor driven saw blade being movable about the pivotal mounting of the supporting arm from an upper at rest to a lower operational position, an upper blade guard fixed to said supporting arm for encasing upper areas of said saw blade, a lower swinging blade guard pivotally mounted to said upper blade guard for fully covering the blade when in its rest position and for exposing the saw blade when moved to its operational position, an elongated link pivotally attached at one end to said frame support and having a pre-configured slot at an opposite end which receives a slidable pin that is attached to the lower swinging blade guard adjacent the pivotal mounting of the lower swinging blade guard to the upper blade guard, and a bearing element attached to the upper blade guard in laterally spaced relationship to said pin for engaging a pre-configured shoulder on an upper surface of the elongated link, and the pre-configured shoulder on the upper surface of said elongated link cooperating with the pre-configured slot to control the slidable movement of the slidable pin in said pre-configured slot for controlled exposure of the lower swinging blade guard relative to the saw blade, whereby rotation of the saw blade from an upper at rest to a lower operational position causes the bearing to press against the upper surface including the pre-configured shoulder of the link while also causing edge surface areas surrounding the pre-configured slot in the link to press against the pin to rotate the lower swinging blade guard for exposure of said saw blade.

10. The swinging blade guard assembly as defined in claim 9 wherein the pre-configured shoulder and pre-configured slot are constructed to facilitate rapid partial opening of the lower swinging blade guard and partial exposure of the saw blade to a workpiece during initial downward movement of the motor driven saw blade, with subsequent slower rotation of the lower swinging blade guard and slower exposure of the saw blade during the remainder of the saw blade travel.

* * * * *